(No Model.)
W. E. WILD.
MACHINE FOR REBORING CYLINDERS.
No. 275,102. Patented Apr. 3, 1883.
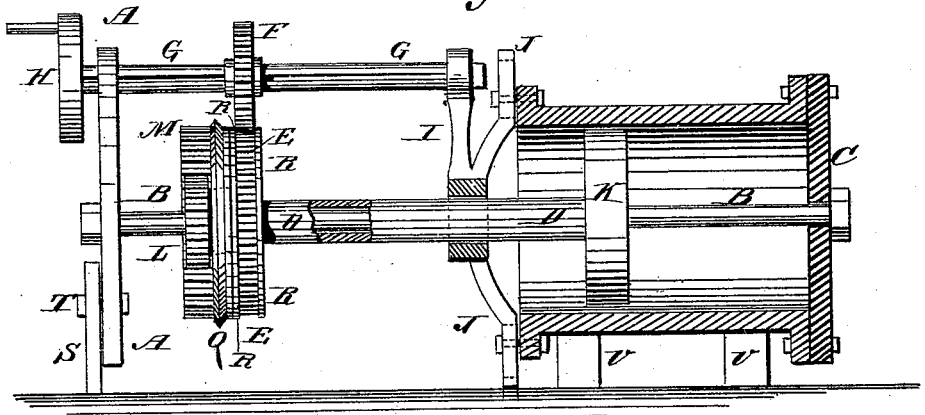
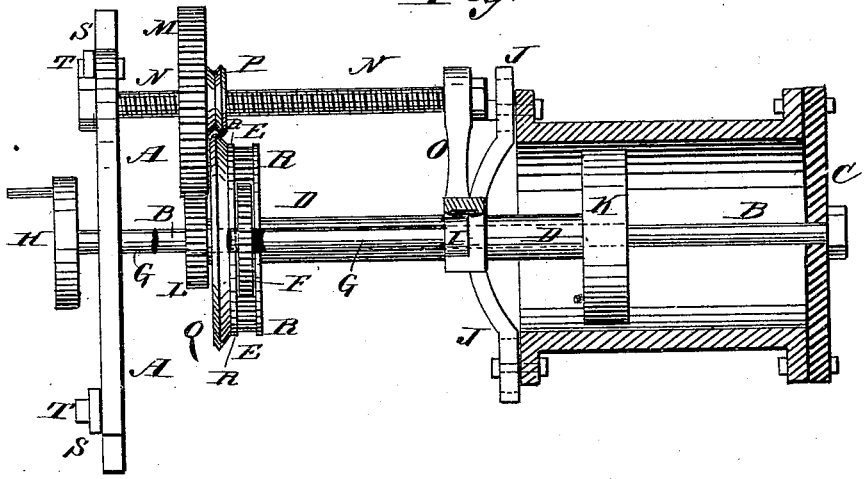
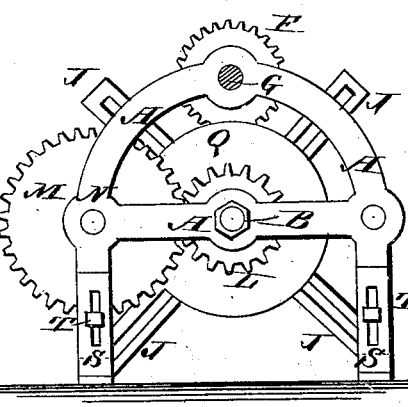
WITNESSES:
F. McArdle.
C. Sedgwick
INVENTOR:
W. E. Wild
BY
Munn & Co
ATTORNEYS.

UNITED STATES PATENT OFFICE.

WILLIAM E. WILD, OF CANDALARA, NEVADA.

MACHINE FOR REBORING CYLINDERS.

SPECIFICATION forming part of Letters Patent No. 275,102, dated April 3, 1883.

Application filed October 20, 1882. (No model.)

*To all whom it may concern:*

Be it known that I, WILLIAM EDWARD WILD, of Candalara, in the county of Esmeralda and State of Nevada, have invented a new and useful Improvement in Portable Machines for Reboring Cylinders, of which the following is a full, clear, and exact description.

Reference is to be had to the accompanying drawings, forming part of this specification, in which similar letters of reference indicate corresponding parts in all the figures.

Figure 1 is a side elevation, partly in section, of my improvement, shown as used in reboring a steam-cylinder. Fig. 2 is a plan view of the same, partly in section and parts being broken away. Fig. 3 is an end elevation of the same, the drive-shaft being shown in section.

The object of this invention is to facilitate the reboring of cylinders without removing the said cylinders from their beds.

The invention consists in a machine for reboring cylinders, constructed with a spider made with radial slots in its arms to receive the fastening-bolts, and provided with radial arms to receive and support the drive-shaft and the feed-screw, so that the machine can be readily secured to the cylinder and the operating parts of the machine will be connected and held in place. To the legs of the upright frame of the machine are bolted legs provided with vertical slots, so that the machine can be readily adjusted higher or lower, as the position of the cylinder may require, as will be hereinafter fully described.

A is an upright frame, to the center of the lower cross-bar of which is attached the end of a rod, B. The other end of the rod B is attached to the head C of a steam-cylinder. Upon the rod B is placed a hollow shaft, D, to which, near its upper end, is attached a large gear-wheel, E, the teeth of which mesh into the teeth of a smaller gear-wheel, F, placed upon a shaft, G, and connected with it by a tongue and groove, so that it can slide longitudinally upon the said shaft, and will be carried around by and with the said shaft in its revolution. The upper end of the shaft G passes through and revolves in bearings in the upper part of the frame A, and to the said end is attached a crank-wheel, H, which I prefer to make in the form of a pulley, so that it can receive a driving-belt when power is available. The other end of the drive-shaft G revolves in a bearing in the outer end of an arm, I, formed upon or rigidly connected with the hub of a spider, J, to which the cylinder-flange is bolted, and which has radial slots formed in its arms to receive the fastening-bolts, so that steam-cylinders of different sizes can be readily bolted to it. The hollow shaft D passes through and revolves in the hub of the spider J, and to its lower end is attached a tool-holding plate, K.

To the upper end of the hollow shaft D is attached a small gear-wheel, L, the teeth of which mesh into the teeth of a larger gear-wheel, M. The hub of the gear-wheel M is made with an interior screw-thread to receive and fit upon the screw N, the upper end of which is attached to the frame A. The lower end of the screw N is secured to the outer end of an arm, O, the inner end of which is formed upon or attached to the hub of the spider J.

To the gear-wheel M is attached, or upon it is formed, a grooved pulley, P, the groove of which receives the edge of a flange, Q, attached to or formed upon the gear-wheel E, so that the said gear-wheel M, as it moves longitudinally upon the screw N, will carry the gear-wheel E and the hollow shaft D with it to feed the tool-holding plate K to its work, and will withdraw it therefrom.

To the sides of the gear-wheel E are attached flanges R, between which the gear-wheel F works, so that the gear-wheel E will carry the gear-wheel F with it as it is fed toward and withdrawn from the work.

S are extension-legs, which are slotted vertically to receive the bolts T, that secure them to the legs of the frame A, so that the said legs S can be readily adjusted to raise or lower the frame A, as the cylinder to be rebored may require.

In using the machine the cylinder is secured to the spider J and rod B in the manner hereinbefore described, and as the drive-shaft G is revolved in one direction the hollow shaft D and the tool-holding plate K will be fed to the work automatically, and will be withdrawn from the work when the said drive-shaft is turned in the opposite direction.

Having thus described my invention, what

I claim as new, and desire to secure by Letters Patent, is—

1. In a machine for reboring cylinders, the spider J, made with radial slots in its arms to receive the fastening-bolts, and provided with radial arms to receive and support the drive-shaft and feed-screw, substantially as herein shown and described.

2. In a machine for reboring cylinders, the combination, with the hollow shaft D, carrying the tool-holding plate, the drive-shaft G, and the feed-screw N, of the spider J, having radial slots, and provided with the radial arms I O, substantially as herein shown and described, whereby the machine can be readily secured to the cylinder and the operating parts of the machine will be connected and held in place, as set forth.

3. In a machine for reboring cylinders, the combination, with the upright frame A, of the slotted legs S and the fastening-bolts T, substantially as herein shown and described, whereby the machine can be readily adjusted higher or lower, as the cylinder to be rebored may require, as set forth.

WILLIAM EDWARD WILD.

Witnesses:
JAMES T. GRAHAM,
C. SEDGWICK.